(12) United States Patent
Hsu et al.

(10) Patent No.: US 10,350,690 B2
(45) Date of Patent: Jul. 16, 2019

(54) CUTTING MACHINE FOR WINDOW BLIND

(71) Applicant: Wealth Long Enterprise Co., Ltd., Yuanlin, Changhua County (TW)

(72) Inventors: Hao-Yu Hsu, Yuanlin (TW); Yao-Tsun Wu, Yuanlin (TW)

(73) Assignee: WEALTH LONG ENTERPRISE CO., LTD. (TW)

( * ) Notice: Subject to any disclaimer, the term of this patent is extended or adjusted under 35 U.S.C. 154(b) by 154 days.

(21) Appl. No.: 15/677,090

(22) Filed: Aug. 15, 2017

(65) Prior Publication Data
US 2019/0054551 A1 Feb. 21, 2019

(51) Int. Cl.
*B23D 23/00* (2006.01)

(52) U.S. Cl.
CPC ........ *B23D 23/00* (2013.01); *B23D 2023/005* (2013.01); *Y10T 83/0586* (2015.04); *Y10T 83/408* (2015.04); *Y10T 83/412* (2015.04)

(58) Field of Classification Search
CPC . B23D 23/00; B23D 2020/005; Y10T 83/412; Y10T 83/408; Y10T 83/0586; Y10T 83/404; Y10T 83/7487; Y10T 83/7587; Y10T 29/39
USPC ........................................ 83/58–68, 197–198
See application file for complete search history.

(56) References Cited

U.S. PATENT DOCUMENTS

| | | | | |
|---|---|---|---|---|
| 6,167,789 B1 * | 1/2001 | Daniels | ................... | E06B 9/266 29/24.5 |
| 6,240,824 B1 * | 6/2001 | Hsu | ....................... | B23D 23/00 29/24.5 |
| 6,336,388 B1 * | 1/2002 | Marocco | .............. | B23D 45/003 29/24.5 |
| 6,688,204 B2 * | 2/2004 | Huang | ................... | B23D 23/00 29/24.5 |
| 6,971,296 B2 * | 12/2005 | Lin | ........................ | B23D 23/00 83/404 |
| 7,104,175 B2 * | 9/2006 | Roberts | ................... | B23D 23/00 83/198 |
| 7,114,421 B2 * | 10/2006 | Marocco | ............... | B23D 23/00 83/13 |
| 8,783,143 B2 * | 7/2014 | Kollman | ............... | B23D 23/00 83/167 |
| 8,839,701 B2 * | 9/2014 | Begin | .................. | B23D 45/003 83/437.1 |
| 8,839,703 B2 * | 9/2014 | Kollman | ............... | B23D 23/00 83/196 |

(Continued)

*Primary Examiner* — Laura M Lee
(74) *Attorney, Agent, or Firm* — Alan D. Kamrath; Mayer & Williams PC

(57) ABSTRACT

A cutting machine is employed to cut a window blind which includes a first support stem, a second support stem, and multiple slats. The cutting machine contains: a base, a cutting mount, a rotary cutting disc, a slidable cutter, a switch unit, and a positioning mechanism. The cutting mount includes a first through hole and a second through hole. The rotary cutting disc is configured to rotatably cut the window blind from the first through hole to the second through hole. The slidable cutter is configured to slidably cut the window blind from the second through hole to the first through hole. The switch unit includes a separation portion which moves upwardly and downwardly and has a cutting plate proximate to the slidable cutter. The positioning mechanism is configured to fix the window blind based on a desired cut length of the window blind.

4 Claims, 13 Drawing Sheets

(56) References Cited

U.S. PATENT DOCUMENTS

2010/0126323 A1\* 5/2010 Chen .................... B23D 45/003
  83/197
2017/0021517 A1\* 1/2017 Hsu ......................... B26D 7/01

\* cited by examiner

US 10,350,690 B2

CUTTING MACHINE FOR WINDOW BLIND

BACKGROUND OF THE INVENTION

Field of the Invention

The present invention relates to a cutting machine, and more particularly to the cutting machine which cuts a window blind to a desired length.

Description of the Prior Art

A curtain is applied to shield and decorate windows of a building, and a window blind is a type of the curtain and is used popularly. The window blind contains a first support stem, a second support stem, and multiple slats. As producing the window blind, it is set in a variety of sizes (i.e. lengths of the first support stem, the second support stem, and the multiple slats are equal a horizontal width of the window blind). Thereby, a cutting machine cuts and trims the window blind at a desired width so that the window blind decorates a window and shield lights.

The cutting machine cuts the window blind by using a rotary cutting disc and a slidable cutter. For example, the rotary cutting disc cuts the window blind made of wood flatly and vertically. Therefore, as cutting the multiple slats made of plastic or aluminum, the multiple slats are too thin to be cut smoothly (i.e. edges of the multiple slats are sharp), thus injuring people or object easily. When the slidable cutter slidably cuts the multiple slats, it cannot cut the multiple slats made of wood smoothly, and edges of the multiple slats are cut irregularly and distortedly.

The cutting machine contains a mold on which a through hole is defined so as to insert the first support stem, the second support stem, and the multiple slats. However, shapes and sizes of cross sections of the first support stem, the second support stem, and the multiple slats are different, and the mold of the cutting machine cannot be replaced, so the cutting machine can only cut the first support stem, the second support stem, and the multiple slats of a fixed size. An improved cutting machine has plural molds which are replaceable according to desired cutting size, but it is troublesome to replace the molds.

The present invention has arisen to mitigate and/or obviate the afore-described disadvantages.

SUMMARY OF THE INVENTION

The primary objective of the present invention is to provide a cutting machine which contains a rotary cutting disc, a slidable cutter, and a switch unit, so the rotary cutting disc is applied to cut multiple slats made of wood. In addition, when the multiple slats of the window blind are made of plastic or aluminum, the rotary cutting disc rotatably cuts the window blind, and the slidable cutter slidably trims the edges of the multiple slats in an arc shape so as to avoid the multiple slats injuring people or objects, thus enhancing safety of the window blind. Preferably, the multiple slats of the window blind are cut and trimmed tidily, and the cutting machine cuts the multiple slats made of plastic, aluminum, and wood.

Another objective of the present invention is to provide a cutting machine which contains a first through hole of a cutting mount configured to accommodate a first support stem of the window blind, and the cutting mount includes the second through hole configured to accommodate the second support stem and the multiple slats of the window blind, such that the cutting machine cuts the window blind of various sizes by using the switch unit so as to reduce cutting cost, avoid replacement of molds, and save time and labor cost efficiently.

To achieve above-mentioned objectives, a cutting machine provided by the present invention contains: a base, a cutting mount, a rotary cutting disc, a slidable cutter, a switch unit, and a positioning mechanism.

The base is an elongated platform.

The cutting mount includes a first through hole configured to accommodate the first support stem, and the cutting mounting includes a second through hole configured to accommodate the second support stem and multiple slats and communicating with the first through hole, and one side of the cutting mount is coupled with the base.

The rotary cutting disc is mounted on the cutting mount adjacent to the base and configured to rotatably cut the window blind from the first through hole to the second through hole, wherein the rotary cutting disc rotates across the first through hole and the second through hole.

The slidable cutter is fixed on the cutting mount adjacent to the base and configured to slidably cut the window blind from the second through hole to the first through hole.

The switch unit includes a separation portion which moves upwardly and downwardly, wherein when the separation portion moves downwardly, the separation portion separates the first through hole from the second through hole, and the separation portion has a cutting plate arranged on one side thereof and proximate to the slidable cutter, the slidable cutter slides across the second through hole and contacts with the cutting plate.

The positioning mechanism is configured to fix the window blind based on a desired cut length of the window blind.

DETAILED DESCRIPTION OF THE PREFERRED EMBODIMENTS

Figure 1:
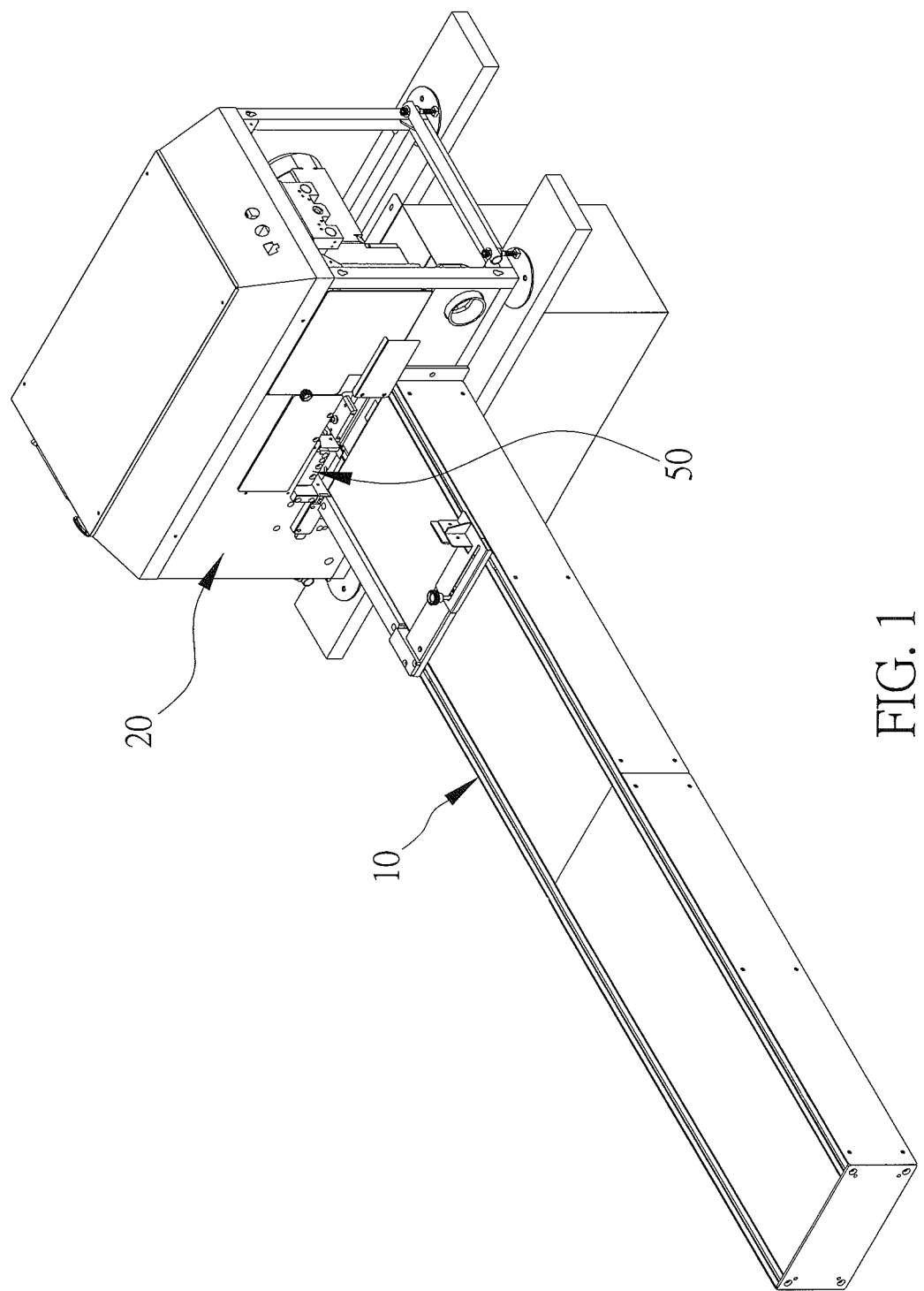
FIG. 1 is a perspective view showing the assembly of a cutting machine for a window blind according to a preferred embodiment of the present invention.
Figure 2:
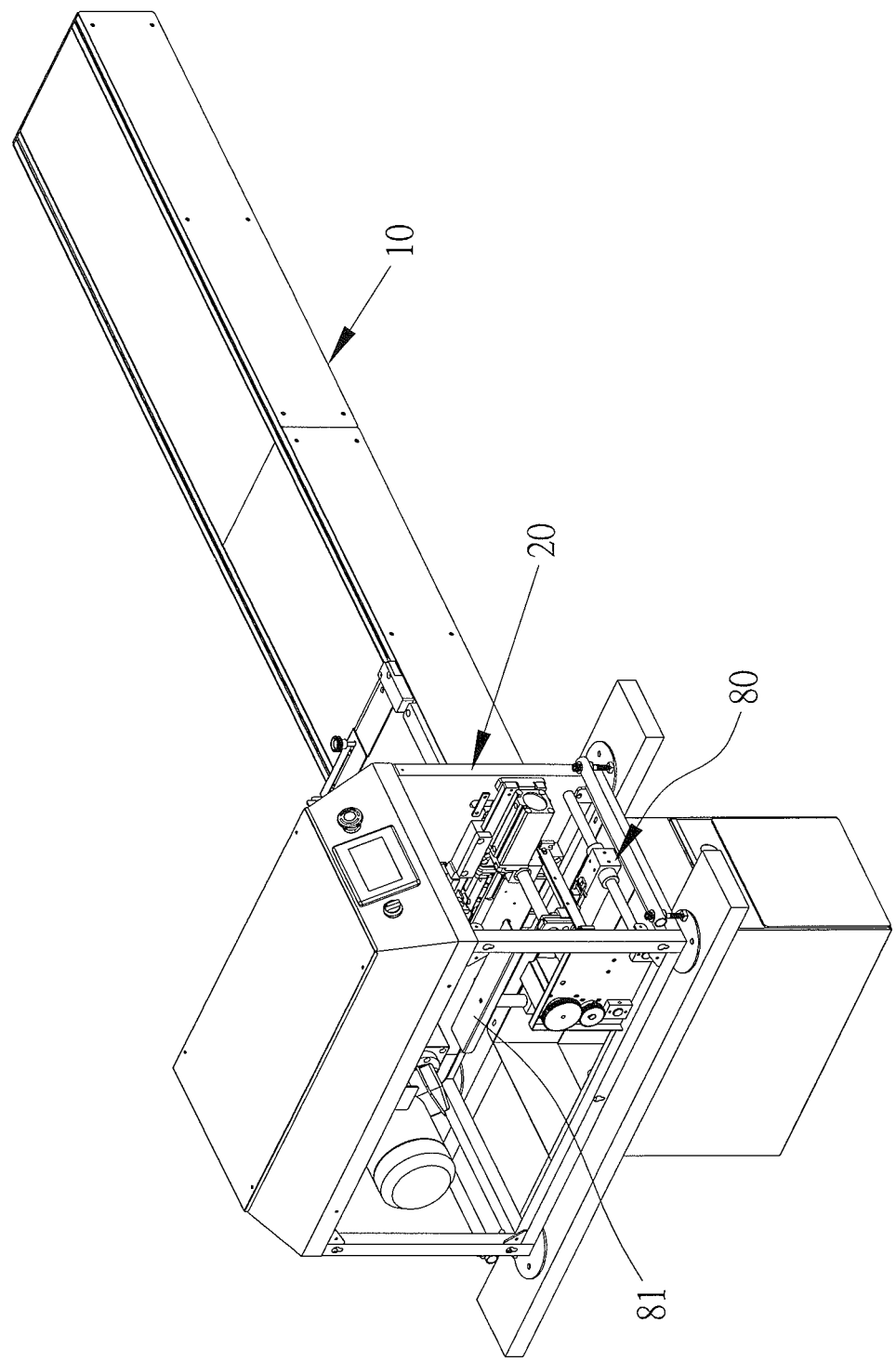
FIG. 2 is another perspective view showing the assembly of the cutting machine for the window blind according to the preferred embodiment of the present invention.
Figure 3:
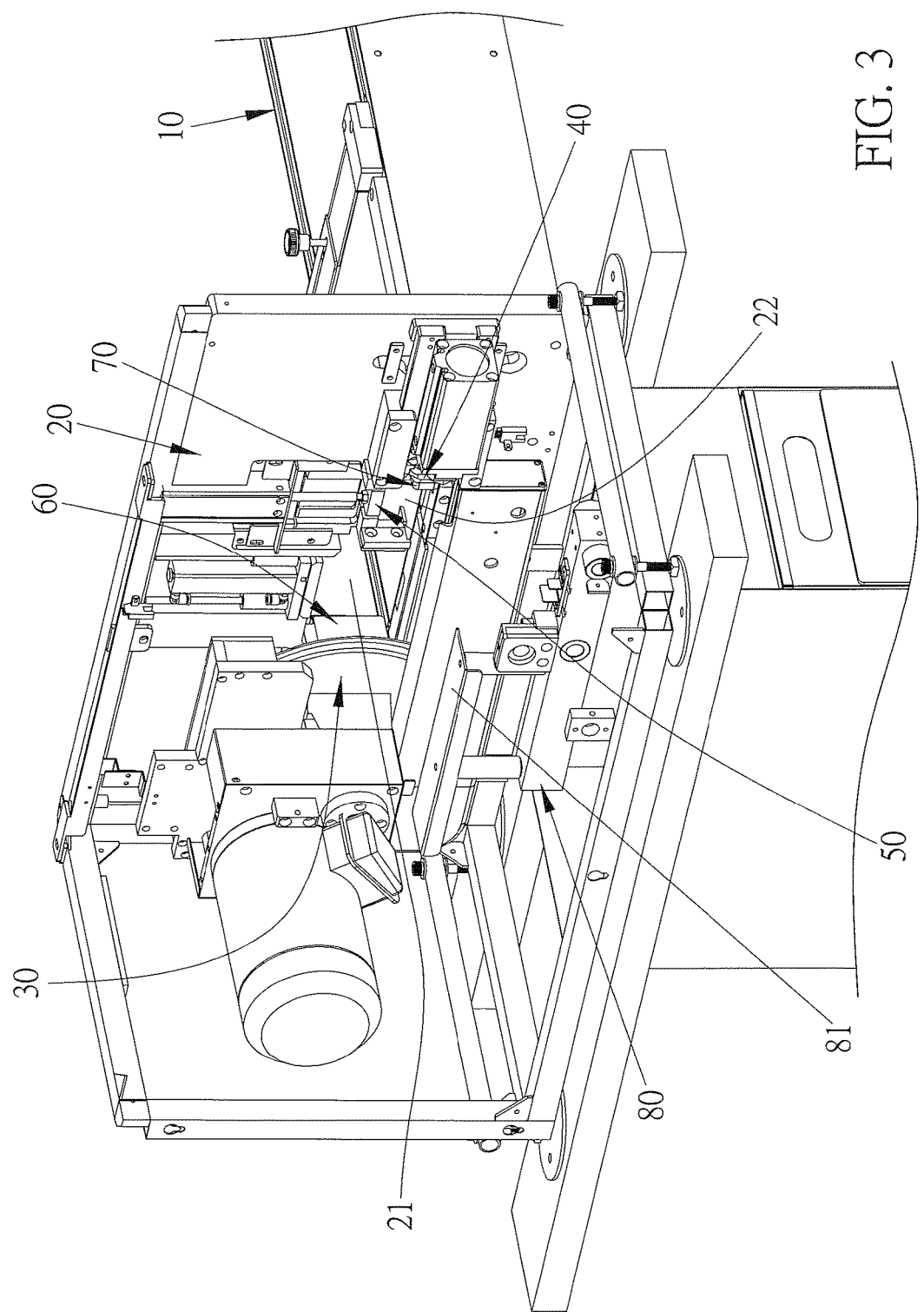
FIG. 3 is an amplified perspective view showing the assembly of a part of the cutting machine for the window blind according to the preferred embodiment of the present invention.
Figure 4:
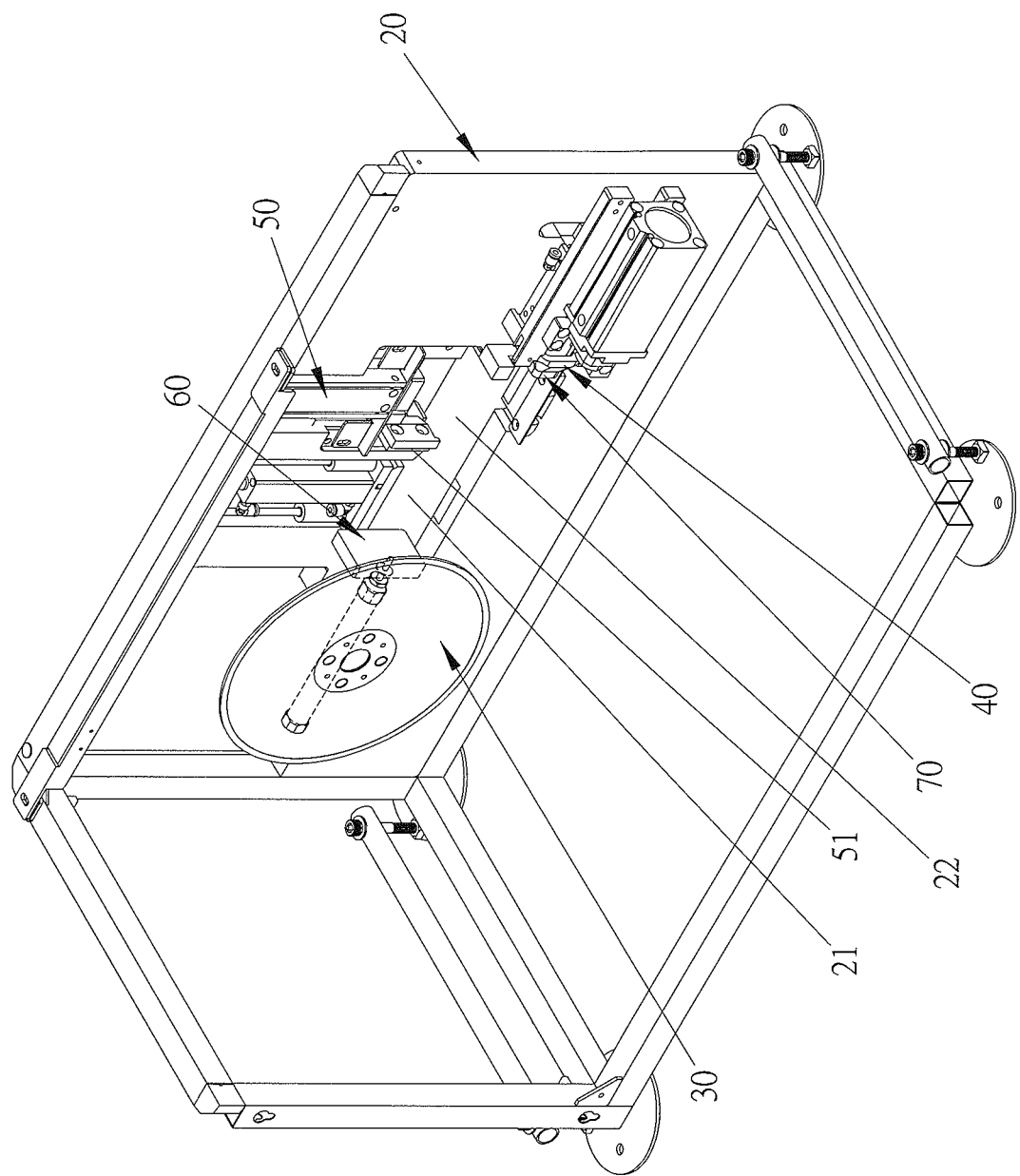
FIG. 4 is another amplified perspective view showing the assembly of a part of the cutting machine for the window blind according to the preferred embodiment of the present invention.
Figure 5:
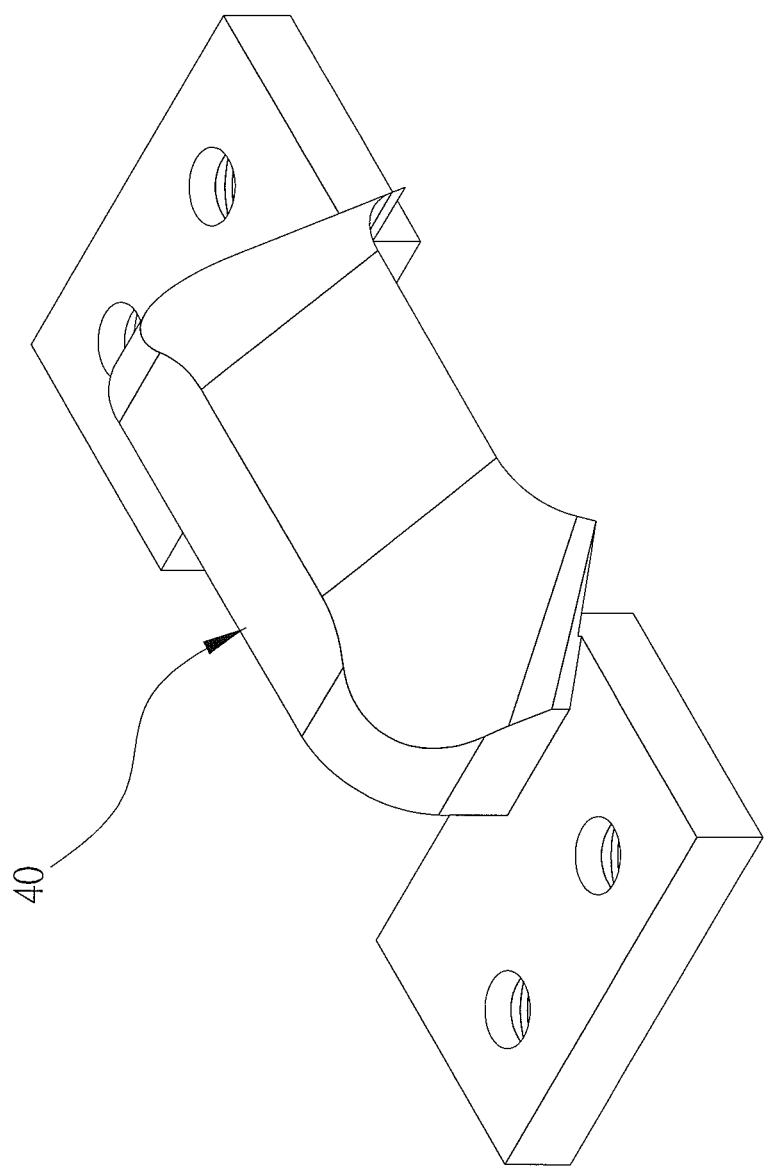
FIG. 5 is a perspective view showing the assembly of a slidable cutter of the cutting machine for the window blind according to the preferred embodiment of the present invention.

The present invention will be clearer from the following description when viewed together with the accompanying drawings, which show, for purpose of illustrations only, a preferred embodiment in accordance with the present invention.

With reference to FIGS. 1-5, a cutting machine for a window blind according to a preferred embodiment of the present invention comprises: a base 10, a cutting mount 20, a rotary cutting disc 30, a slidable cutter 40, a switch unit 50, a first push unit 60, a second push unit 70, and a positioning mechanism 80.

The base 10 is an elongated platform.

The cutting mount 20 includes a first through hole 21 and a second through hole 22 communicating with the first through hole 21, and one side of the cutting mount 20 is coupled with the base 10.

The rotary cutting disc 30 is mounted on the cutting mount 20 adjacent to the base 10 and configured to rotatably cut a window blind from the first through hole 21 to the second through hole 22, wherein the rotary cutting disc 30 rotates across the first through hole 21 and the second through hole 22.

The slidable cutter 40 is fixed on the cutting mount 20 adjacent to the base 10 and configured to slidably cut the window blind from the second through hole 22 to the first through hole 21, wherein the slidable cutter 40 slides across the second through hole 22.

The switch unit 50 is located above the second through hole 22 and includes a separation portion 51 which moves upwardly and downwardly, wherein when the separation portion 51 moves downwardly, the separation portion 51 separates the first through hole 21 from the second through hole 22, and the separation portion 51 has a cutting plate 511 arranged on one side thereof and proximate to the slidable cutter 40.

The first push unit 60 is arranged beside the first through hole 21, and a movement direction of the first push unit 60 is the same as that of the rotary cutting disc 30 so as to push the window blind toward the second through hole 22.

The second push unit 70 is arranged beside the second through hole 22, and a movement direction of the second push unit 70 is the same as that of the slidable cutter 40 so as to push the window blind toward the first through hole 21.

The positioning mechanism 80 is configured to fix the window blind based on a desired cut length of the window blind, and the positioning mechanism 80 includes a fixing element 81 located thereon opposite to the base 10 and corresponding to the first through hole 21 and the second through hole 22 of the cutting mount 20, wherein the fixing element 81 moves to adjust a distance between the fixing element 81 and the cutting mount 20.

Figure 6:
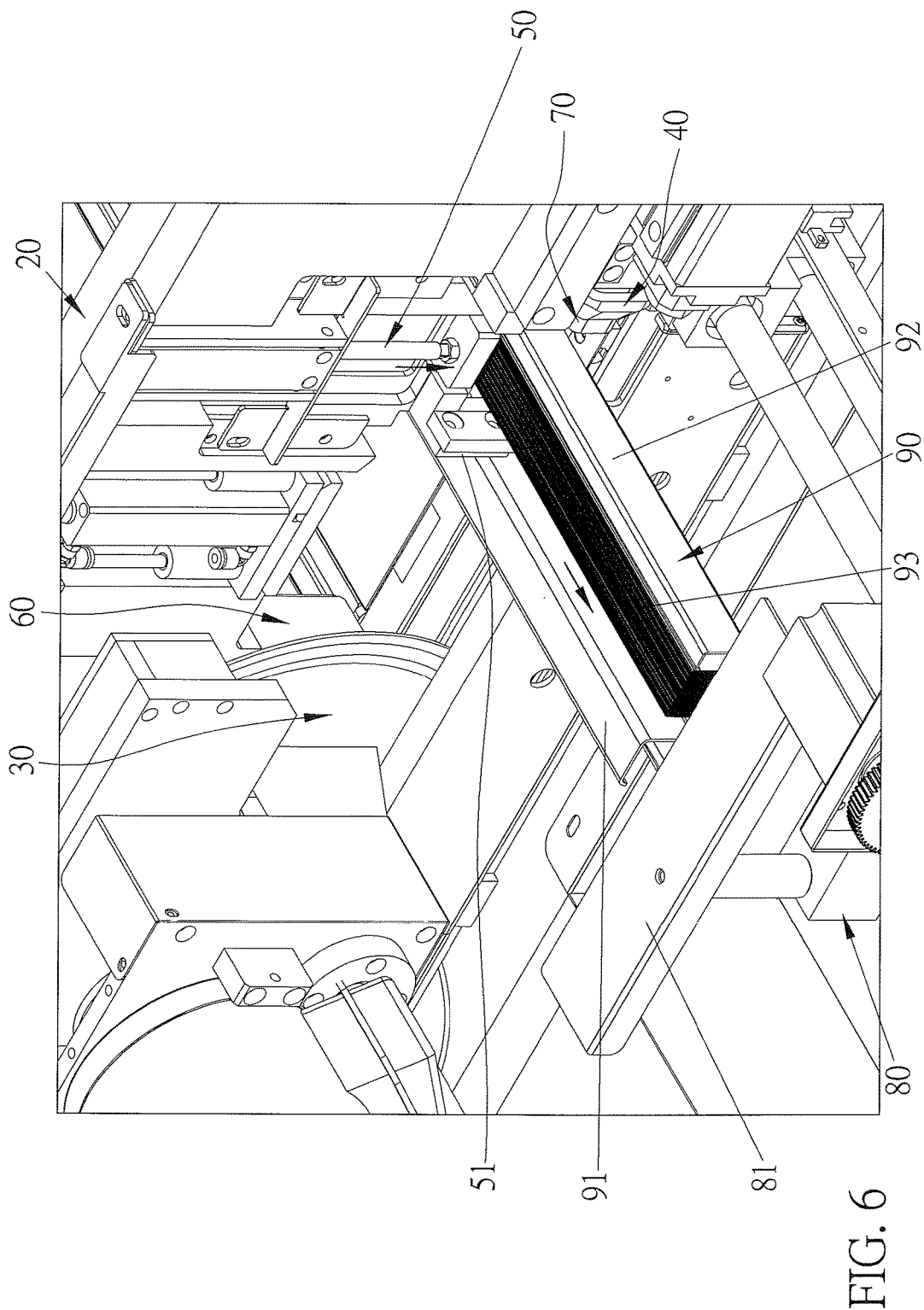
FIG. 6 is a perspective view showing the operation of the cutting machine for the window blind according to the preferred embodiment of the present invention.
Figure 7:
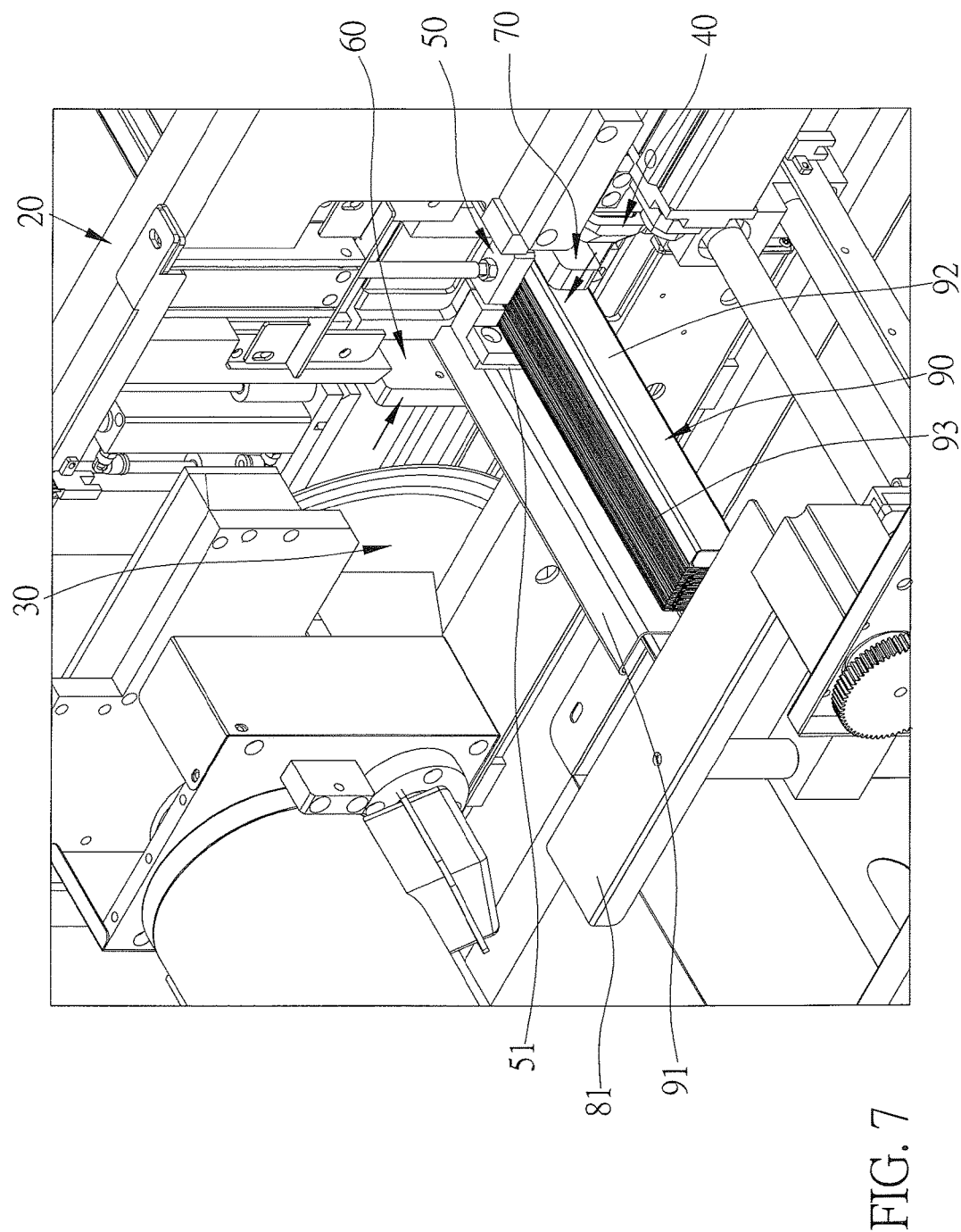
FIG. 7 is another perspective view showing the operation of the cutting machine for the window blind according to the preferred embodiment of the present invention.
Figure 8:
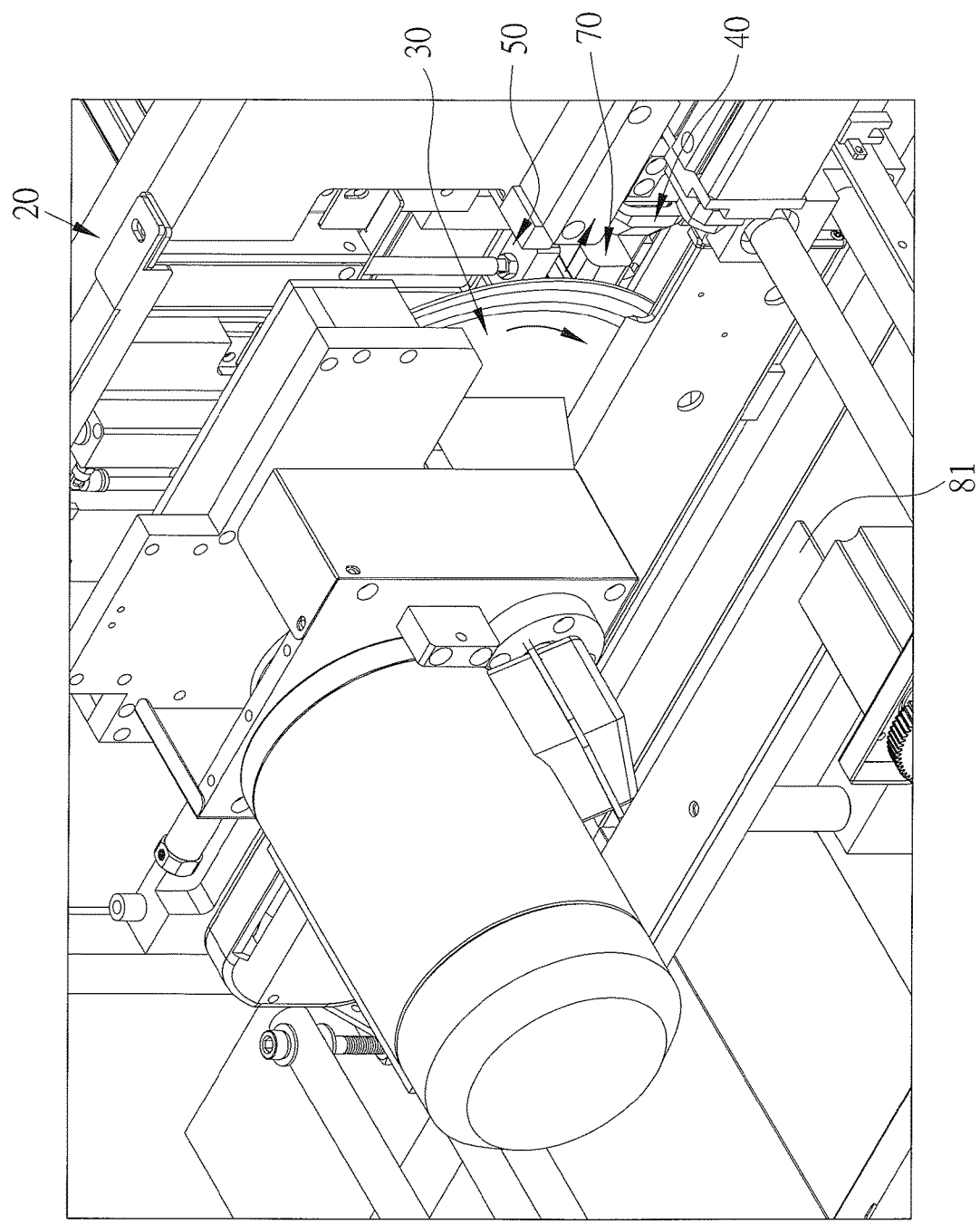
FIG. 8 is also another perspective view showing the operation of the cutting machine for the window blind according to the preferred embodiment of the present invention.
Figure 9:
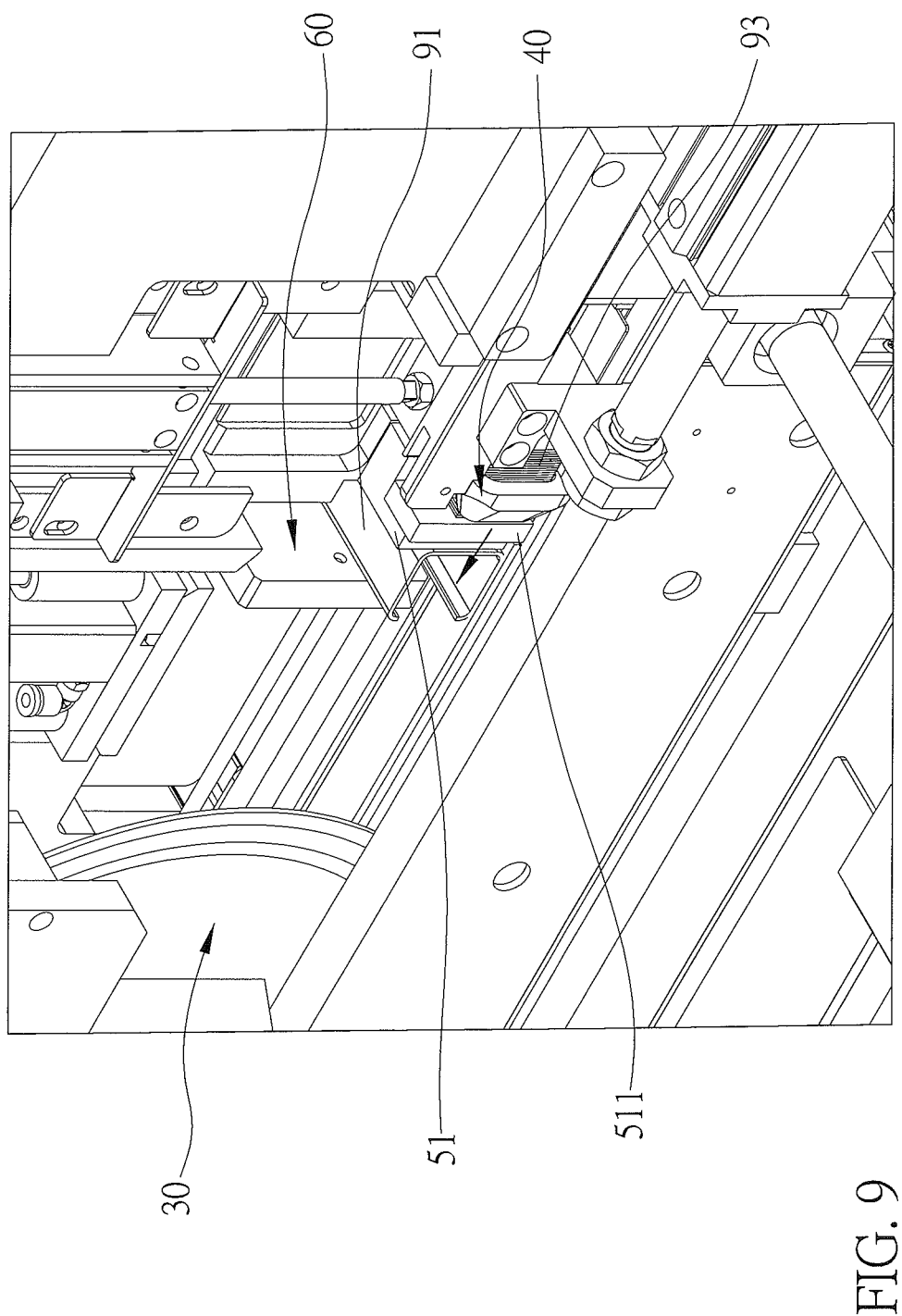
FIG. 9 is still another perspective view showing the operation of the cutting machine for the window blind according to the preferred embodiment of the present invention.
Figure 10:
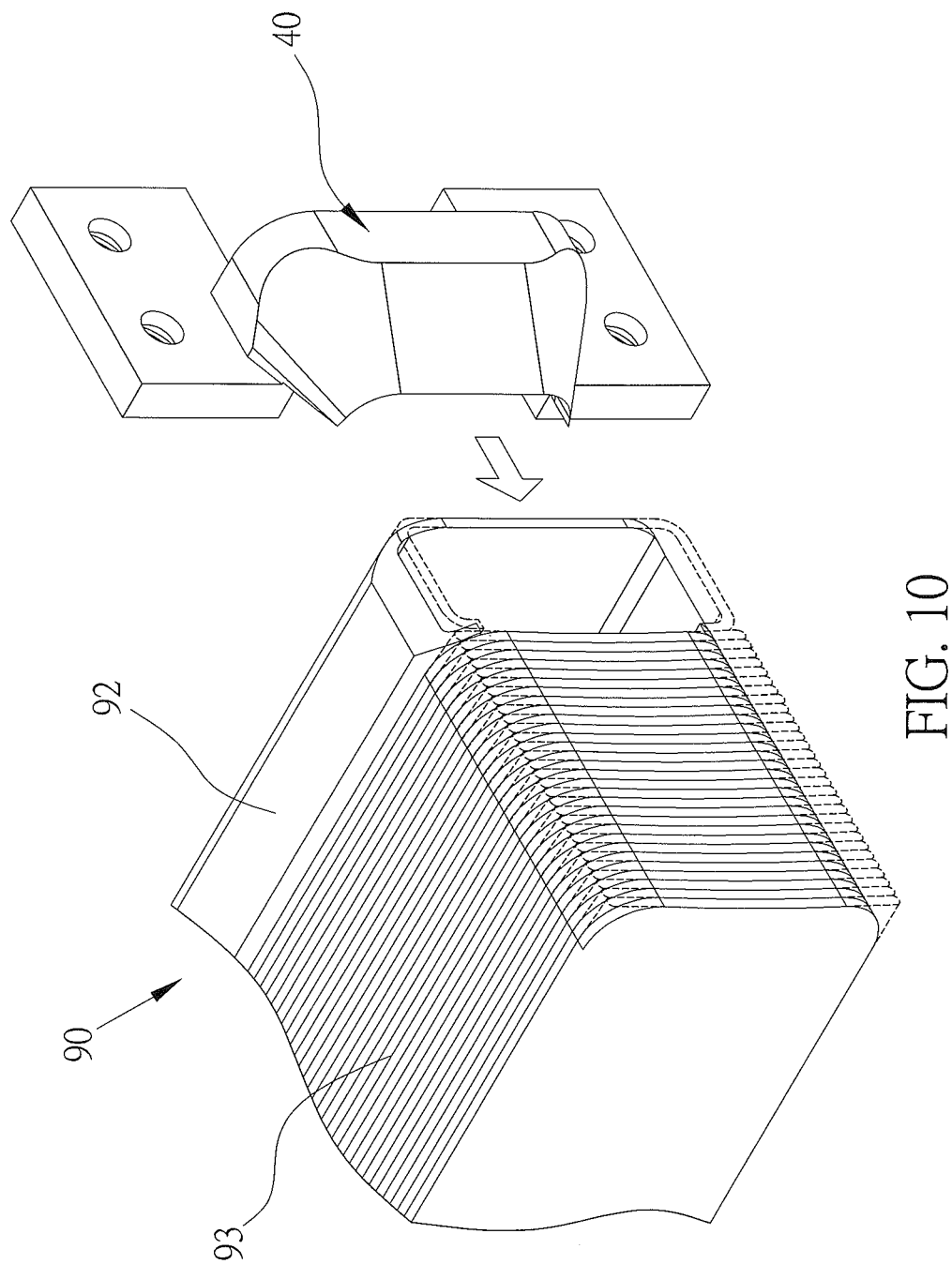
FIG. 10 is another perspective view showing the operation of the cutting machine for the window blind according to the preferred embodiment of the present invention.

The cutting machine of the present invention is employed to cut the window blind 90, and the window blind 90 includes a first support stem 91, a second support stem 92, and multiple slats 93. When the multiple slats 93 of the window blind are made of plastic or aluminum and are cut by the cutting machine, as shown in FIG. 6, the separation portion 51 of the switch unit 50 moves downwardly so as to separate the firth through hole 21 from the second through hole 22, and the fixing element 81 moves to adjust the distance between the fixing element 81 and the cutting mount 20 based on the desired cut length of the window blind 90. Thereafter, the first support stem 91 of the window blind 90 is inserted through the first through hole 21 of the cutting mount 20, the second support stem 92 of the window blind 90 and the multiple slats 93 are inserted through the second through hole 22 of the cutting mount 20, and the first support stem 91, the second support stem 92, and the multiple slats 93 are fixed by the fixing element 81 of the positioning mechanism 80. As illustrated in FIG. 7, the first push unit 60 pushes the first support stem 91 of the window blind 90 toward the second through hole 22 so that the first support stem 91 abuts against the separation portion 51, and the second push unit 70 pushes the second support stem 92 and the multiple slats 93 toward the first through hole 21 so that the second support stem 92 and the multiple slats 93 are biased against the separation portion 51. Referring further to FIG. 8, the rotary cutting disc 30 rotates from the first through hole 21 to the second through hole 22 so as to cut the first support stem 91, the second support stem 92, and the multiple slats 93 of the window blind 90. After cutting the first support stem 91, the second support stem 92, and the multiple slats 93 of the window blind 90, the rotary cutting disc 30 rotates back to an original position. With reference to FIGS. 9-10, when the slidable cutter 40 slides from the second through hole 22 to the first through hole 21 so as to contact with the cutting plate 511 of the separation portion 51 of the switch unit 50, the slidable cutter 40 trims edges of the second support stem 92 and the multiple slats 93 of the window blind 90 in an arc shape.

Figure 11:
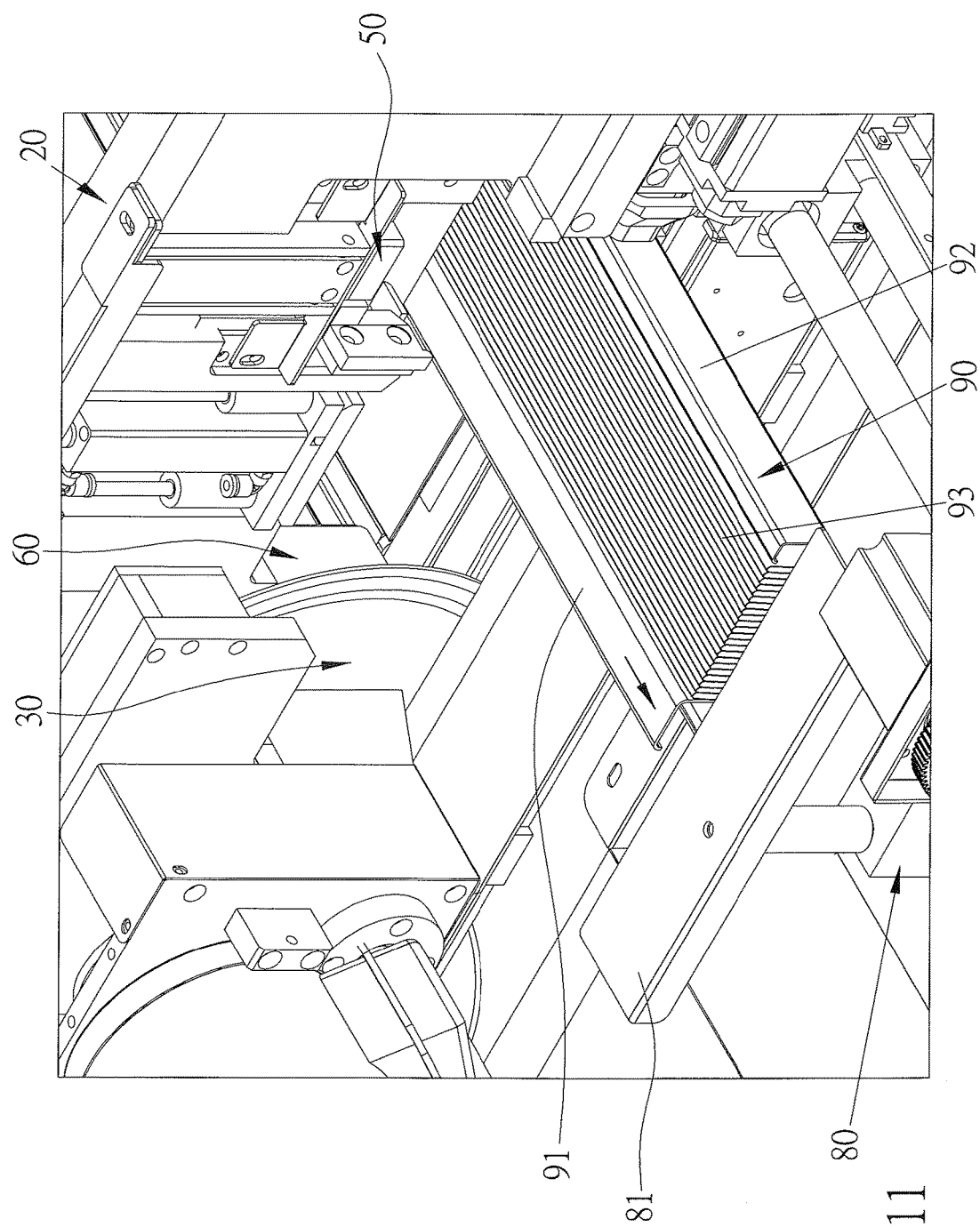
FIGS. 11 to 13 are a perspective view showing another operation of the cutting machine for the window blind according to the preferred embodiment of the present invention.
Figure 12:
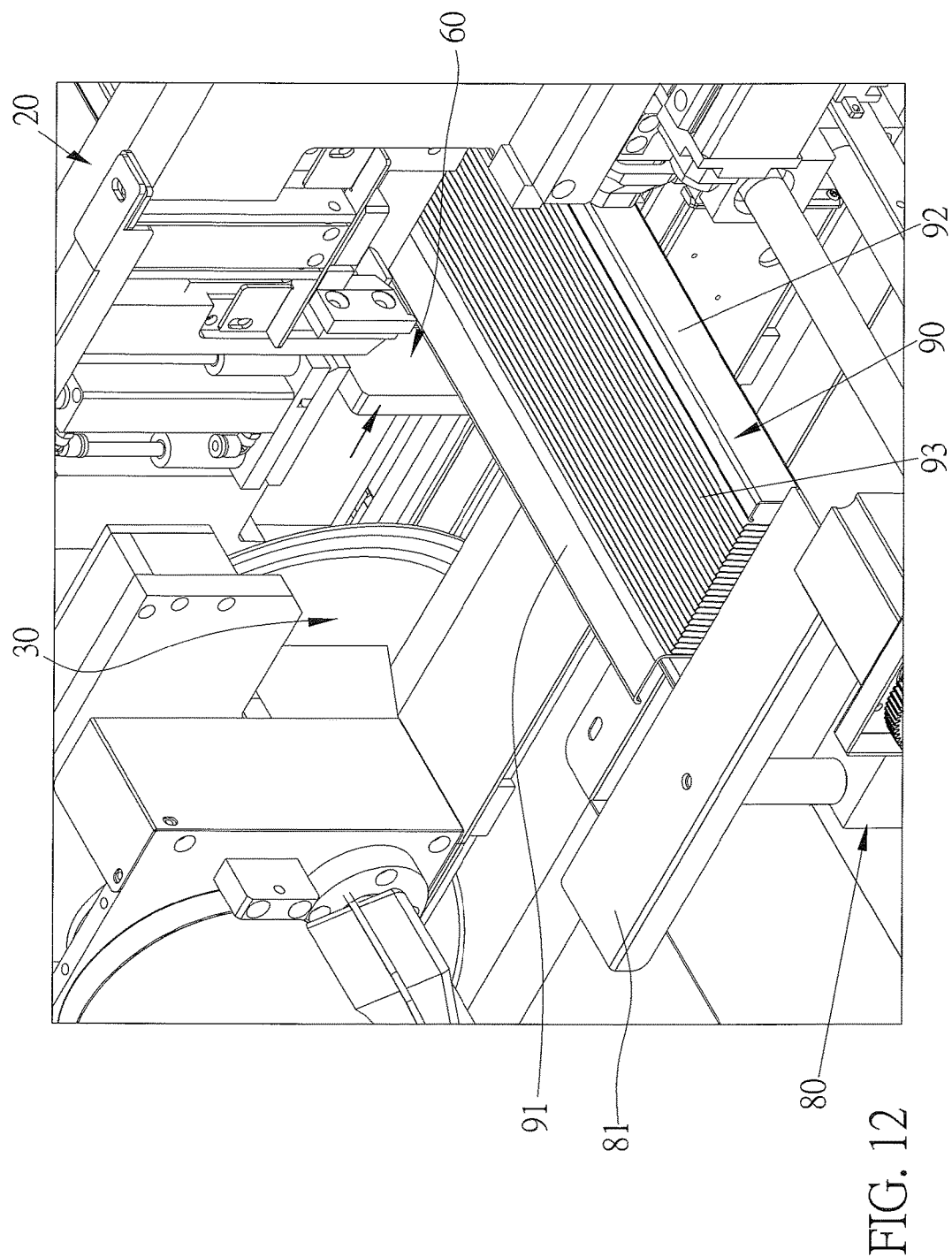
Figure 13:
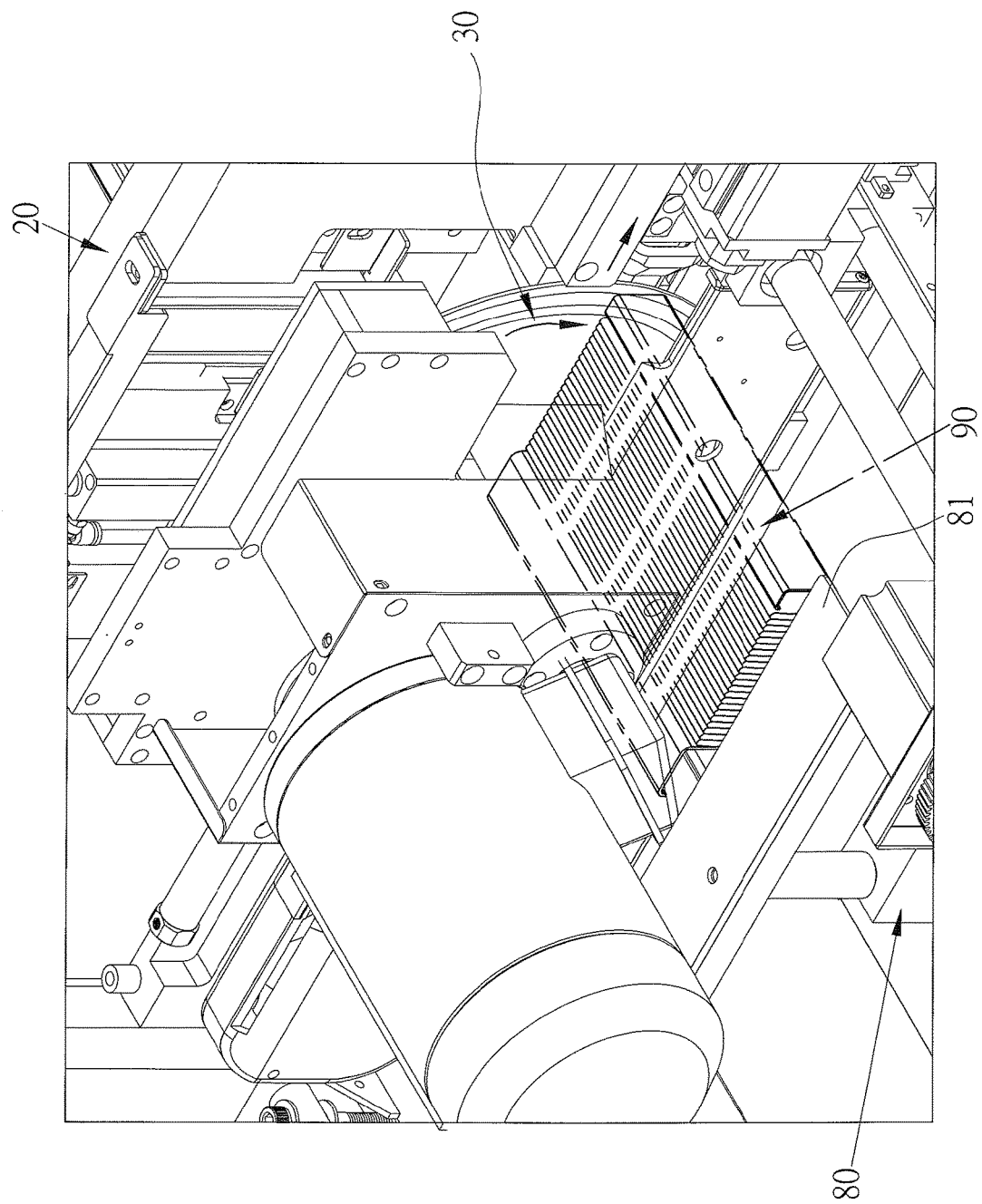

When the multiple slats 93 of the window blind 90 are made of wood, as shown in FIG. 11, the separation portion 51 of the switch unit 50 moves upwardly so that the first through hole 21 communicates with the second through hole 22, and the distance between the fixing element 81 of the positioning mechanism 80 and the cutting mount 20 adjusts based on the desired cut length of the window blind 90, hence the first support stem 91, the second support stem 92, and the multiple slats 93 of the window blind 90 insert through the first through hole 21 and the second through hole 22 and are fixed by the fixing element 81 of the positioning mechanism 80. Referring further to FIG. 12, the first push unit 60 pushes the first support stem 91, the second support stem 92, and the multiple slats 93 of the window blind 90 toward the second through hole 22. As illustrated in FIG. 13, the rotary cutting disc 30 rotates from the first through hole 21 to the second through hole 22 so as to cut the first support stem 91, the second support stem 92, and the multiple slats 93, thus cutting the window blind 90 completely.

Accordingly, the cutting machine of the present invention has following advantages:

1. The cutting machine comprises the rotary cutting disc 30, the slidable cutter 40, and the switch unit 50, so the rotary cutting disc 30 is applied to cut the multiple slats 93 made of wood. In addition, when the multiple slats 93 of the window blind 90 are made of plastic or aluminum, the rotary cutting disc 30 rotatably cuts the window blind 90, and the slidable cutter 40 slidably trims the edges of the multiple slats 93 in the arc shape so as to avoid the multiple slats 93 injuring people or objects, thus enhancing safety of the window blind 90. Preferably, the multiple slats 93 of the window blind 90 are cut and trimmed tidily, and the cutting machine cuts the multiple slats 93 made of plastic, aluminum, and wood.

2. The cutting mount 20 of the cutting machine includes the first through hole 21 configured to accommodate the first support stem 91 of the window blind 90, and the cutting mount 20 includes the second through hole 22 configured to accommodate the second support stem 92 and the multiple slats 93 of the window blind 90, such that the cutting machine cuts the window blind 90 of various sizes by using the switch unit 50 so as to reduce cutting cost, avoid replacement of molds, and save time and labor cost efficiently.

While various embodiments in accordance with the present invention have been shown and described, it is clear to those skilled in the art that further embodiments may be made without departing from the scope of the present invention.

What is claimed is:

1. A cutting machine being employed to cut a window blind which includes a first support stem, a second support stem, and multiple slats, and the cutting machine comprising:
    a base being an elongated platform;
    a cutting mount including a first through hole configured to accommodate the first support stem, and the cutting mount including a second through hole configured to accommodate the second support stem and multiple slats and communicating with the first through hole, and one side of the cutting mount coupled with the base;
    a rotary cutting disc mounted on the cutting mount adjacent to the base and configured to rotatably cut the window blind from the first through hole to the second through hole, wherein the rotary cutting disc rotates across the first through hole and the second through hole;
    a slidable cutter fixed on the cutting mount adjacent to the base and configured to slidably cut the window blind from the second through hole to the first through hole;
    a switch unit including a separation portion which moves upwardly and downwardly, wherein when the separation portion moves downwardly, the separation portion separates the first through hole from the second through hole, and the separation portion has a cutting plate arranged on one side thereof and proximate to the slidable cutter, the slidable cutter slides across the second through hole and contacts with the cutting plate; and
    a positioning mechanism configured to fix the window blind based on a desired cut length of the window blind.

2. The cutting machine as claimed in claim 1 further comprising a first push unit arranged beside the first through hole, and a movement direction of the first push unit is the same as that of the rotary cutting disc so as to push the window blind toward the second through hole.

3. The cutting machine as claimed in claim 1 further comprising a second push unit arranged beside the second through hole, and a movement direction of the second push unit is the same as that of the slidable cutter so as to push the window blind toward the first through hole.

4. The cutting machine as claimed in claim 1, wherein the positioning mechanism includes a fixing element located thereon opposite to the base and corresponding to the first through hole and the second through hole, wherein the fixing element moves to adjust a distance between the fixing element and the cutting mount.

* * * * *